United States Patent [19]
Finak et al.

[11] Patent Number: 6,059,462
[45] Date of Patent: May 9, 2000

[54] OPTICAL COUPLING SYSTEM

[76] Inventors: Jozef Finak, 85 Saddlehorn Cresent, Kanata, Ontario, Canada, K2M 2B1; Neil Teitelbaum, 834 Colonel By Drive, Ottawa, Ontario, Canada, K1S 5C4; Yihao Cheng, 36 Meadowbreeze Drive, Kanata, Ontario, Canada, K2M 2L6

[21] Appl. No.: 09/028,880

[22] Filed: Feb. 24, 1998

[51] Int. Cl.$^7$ .................................................... G02B 6/38
[52] U.S. Cl. .................. 385/73; 385/51; 385/74
[58] Field of Search .................. 385/73, 33, 60, 385/61, 74, 78, 88–94, 51, 54, 44–46, 70, 71, 34; 359/497

[56] References Cited

U.S. PATENT DOCUMENTS

| | | | |
|---|---|---|---|
| 4,767,178 | 8/1988 | Sasaki et al. | 350/96.2 |
| 4,781,431 | 11/1988 | Wesson et al. | 350/96.21 |
| 5,381,495 | 1/1995 | Hu | 385/51 |
| 5,459,805 | 10/1995 | Foster | 385/74 |
| 5,751,874 | 5/1998 | Chudoba et al. | 385/72 |
| 5,841,922 | 11/1998 | Iwatsuka et al. | 385/76 |

*Primary Examiner*—Phan T. H. Palmer
*Attorney, Agent, or Firm*—Neil Teitelbaum & Associates

[57] ABSTRACT

The present invention relates to a coupling element for coupling between optical elements, for instance a ferrule encased fiber end and a lens, two lenses, or filter and lens assemblies, which provides a reliable joint with a determined spacing and angular orientation between them if needed. Advantageously, the coupling in accordance with the present invention does not obscure optical transmission through the coupling with an epoxy layer. A stand off element is provided which has opposite reference surfaces for joining the end faces of the optical elements and a central aperture, slot or equivalent open area for light transmission. In use the open area is aligned, for example with the fiber end and the desired port in the lens. Adhesive connection can be provided between the opposite surfaces of the stand off element and the coupling end faces of the optical elements. No epoxy is applied over the open area. Other securing methods such as external securing elements can be used. Alignment is established by the planar surfaces of the stand off element. The separation between elements can be accurately established by selecting the desired thickness between faces of the stand off element. Alternatively, the surfaces of the stand off element may be angled to compliment the surfaces of the elements, or to provide an accurate angled coupling. Loss is reduced by not transmitting light through an epoxy layer.

19 Claims, 3 Drawing Sheets

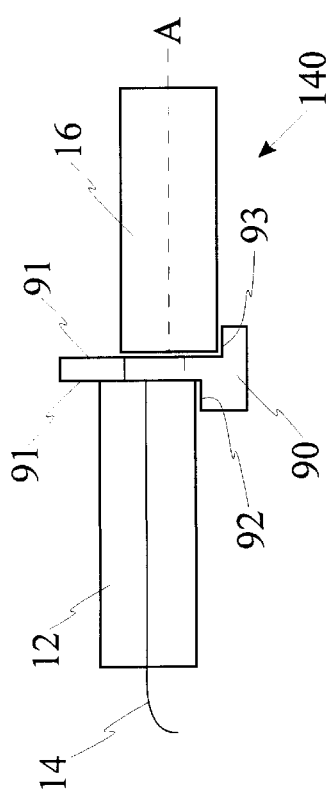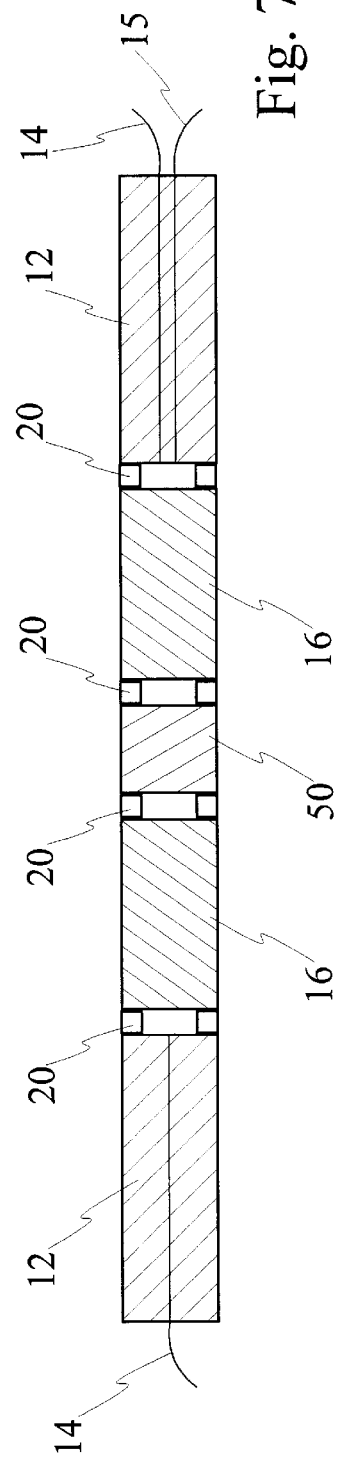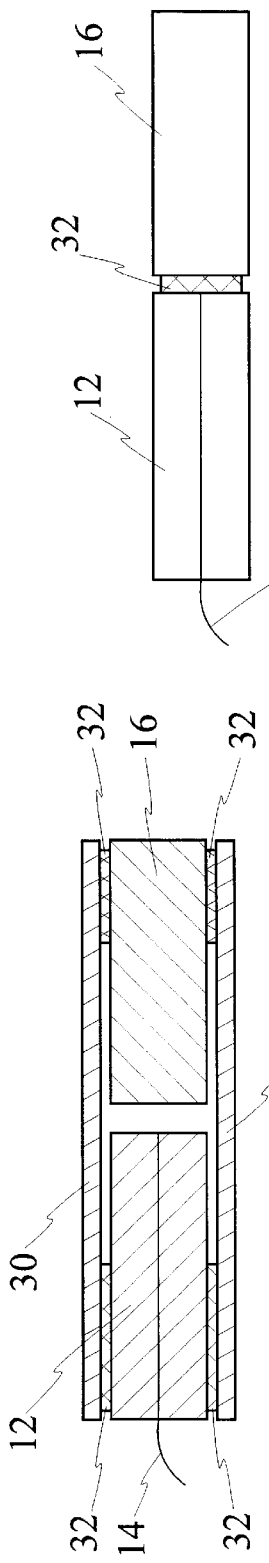

OPTICAL COUPLING SYSTEM

FIELD OF THE INVENTION

The present invention relates to an optical coupling system, particularly a connection system providing a reliable and uniform joint between optical elements.

BACKGROUND OF THE INVENTION

The most common optical connection is between an optical fiber end and a collimating lens, such as a graded index (GRIN) lens. A common coupler system comprises a sleeve in which a fiber end within a supporting ferrule is joined to a lens by attaching the sides of the ferrule and the lens to the interior bore of the sleeve. Manufacturing tolerances of, for instance, the lens diameter, the ferrule diameter, or the dimension and position of the bore within the ferrule, introduce variations which make this type of coupler difficult to use to achieve accurate alignment. The sleeve must have a large enough internal diameter to accommodate a ferrule or lens at its largest tolerance. As a result, smaller elements may unintentionally become tilted within the sleeve. The fiber end within the ferrule is not always concentric. If the ferrule internal diameter is too large for the fiber, or the ferrule bore is not perfectly centred, it becomes necessary to adjust, or tune, the alignment of the fiber to the lens. This is difficult within the confines of the coupling sleeve. Temperature changes in the environment also cause different elements in the sleeve coupler to respond differently, further affecting the quality of the coupling. In many instances, it is preferred to have the fiber aligned at a port on the lens that is disposed adjacent to, rather than aligned with, the optical axis of the lens. This is not possible within a sleeve coupler.

Another common practice is to couple an optical fiber to a lens, such as a graded index (GRIN) lens, by placing the optical fiber into a ferrule or fiber tube and joining an end face of the tube directly to a face of the lens by applying a layer of epoxy between them. A direct ferrule to lens epoxy connection facilitates alignment of the coupled elements and provides a uniform joint. The end faces of the lens and ferrule can be formed to planar surfaces reliably to prevent unwanted tilt angle at the coupling. Positioning the fiber adjacent to the optical axis of the lens is possible without the confining sleeve coupler. Also, relatively easy alignment tuning is possible to compensate for eccentric fiber positioning within the ferrule. However, epoxy is not completely transparent or uniform to transmission. Transmission of light though the epoxy layer results in some loss.

To couple an optical fiber end to an optical element, such as a lens, there are three positioning variables: the spacing between the elements, the coupling point relative to the optical axis, and the coupling angle. Common coupling techniques do not provide a convenient method of adjusting the spacing between the elements, or the coupling angle.

It is often desired to make a coupling with a precise predetermined distance between elements, which is not possible with a direct epoxy connection. Typically this is accomplished by fixing the elements with the desired separation between them on a substrate with adhesive. It is difficult to establish an exact separation, or alignment and angular positioning by this method.

In addition to a controlled coupler spacing, the angle of coupling needed varies. A correct coupling angle is critical in some configurations for a low loss coupling. It has been noted in co-pending application Ser. No. 09/015,325 filed on Jan. 29, 1998 assigned to the same entity as the present application, that substantial coupling losses may occur between an input port on a first GRIN lens, or other type of collimating lens, and an output port of a second collimating lens, when the input and output ports are disposed adjacent the optical axes of the two collimating lenses, and when the distance or gap between the lenses is significant. An optical element, such as a filter, may cause a gap between the GRIN lenses, with the result that the element causes a beam propagating from the input port through the first GRIN lens to be shifted as it traverses the element towards the output port and enters the second lens at an offset to the optical axis of the lens. This beam shift downward results in the output beam exiting upward, no longer parallel to the optical axis. Hence, more efficient coupling can be achieved if the fiber at the output of the lens assembly is provided at an appropriate angle with respect to the optical axis of the lens.

It is desired to provide a coupling system which provides a reliable means for coupling between optical elements. It is further desired to provide a coupling system which is unimpeded by transmission through an epoxy layer. It is also desired to provide a coupling system which can accurately control the spacing between optical elements, and provide adjustment to the alignment and the angle of coupling.

SUMMARY OF THE INVENTION

The present invention has found that using an intermediate stand off coupling element between the optical components which provides reference surfaces for accurately coupling optical elements. The dimensions of the stand off element can be controlled to provide accurate spacing between optical elements, or for establishing a coupling angle. The stand off coupling element includes a transmission window between reference surfaces. Advantageously, this area is free of adhesive, thus improving coupling efficiency.

Accordingly, the present invention comprises a coupling element for joining a housing supporting a first optical element to a second optical element comprising:

a stand off element having a light transmissive region for passing light unobstructed between said first optical element and said second optical element; a first face for securing to a coupling end face of said first optical element and, a second face for securing to a coupling end face of said second element.

A further preferred embodiment of the present invention comprises a fiber coupling comprising:

a housing supporting a fiber end, said housing having a coupling face;

a second optical element for optical coupling with the fiber end having a coupling face;

a coupling member for joining the housing and the second optical element having opposite sides, each defining a reference plane, secured between the coupling faces, and having at least an aperture therein for transmitting light therethrough.

A preferred method according to the present invention of coupling an optical fiber end to a lens comprises:

encasing an end of the optical fiber in a ferrule having a distal coupling face;

providing a lens for coupling to the fiber end having a coupling face;

providing a coupling member having opposite surfaces adapted for mating contact between the coupling face of the ferrule and the coupling face of the lens, and having an open area for transmitting light therethrough;

securing one of the opposite surfaces of the coupling member on the coupling face of the ferrule, aligning the open area with the fiber end within the ferrule to permit unobstructed transmission therethrough;

securing the other of the opposite surfaces of the coupling member to the coupling face of the lens, aligning the desired portion of the lens with the fiber end and the open area of the coupling member.

A stand off element such as an annular or C-shaped element having parallel planar surfaces can easily be secured to the planar ferrule and lens surfaces, as currently used, to provide the advantages of alignment and tuning control. Other optical elements such as multiple lenses, or lenses and filters etc., may also advantageously be coupled using a stand off element to provide reliable coupling with an unimpeded transmission area. The opposite sides of the stand off element may not be planar surfaces, but define opposite reference planes among a number of contact points, for instance, in a star shaped element. One or more apertures or open areas in the stand off element are provided as a window for transmission of light from one element to the other. If the surface contact means used is adhesive, such as epoxy, metal solder, glass solder, molten glass, pressure activated adhesive or the like, applied to the opposite surfaces of the stand off element, it is relatively easy to maintain the open area free of adhesive for unimpeded transmission. It is also possible to adjust the position of the stand off surfaces to control different alignment configurations.

It is an advantage of the present invention that aligned coupling can be effected without loss due to transmission through adhesive.

It is a further advantage of the present invention that alignment parameters, including spacing between optical elements, alignment and angle of coupling can be accurately established using a stand off coupling element between optical elements. Further, these parameters are easily and economically varied by varying the shape of the coupling element.

It is a still further advantage that optical elements can be couple in a spaced apart configuration in a substantially sealed environment.

Further advantages will be apparent to those skilled in the art with reference to the detailed description of preferred embodiments and the accompanying drawings, which illustrate preferred embodiments of the invention by example only, in which:

BRIEF DESCRIPTION OF FIGURES

FIG. 6 is a side view of a further embodiment according to the invention including projecting flanges for establishing a coupling to a port adjacent the optical axis of the lens.

FIG. 7 is a side view of a further coupler assembly in accordance with the present invention illustrating an assembly of optical elements coupled by stand off elements between two optical fiber ends;

FIG. 8 is a cross sectional view of a prior art sleeve coupling system; and,

FIG. 9 is a side view of a further prior art epoxy coupling system.

Like numerals are used throughout to designate like elements.

DETAILED DESCRIPTION OF PREFERRED EMBODIMENTS

Figure 1A:
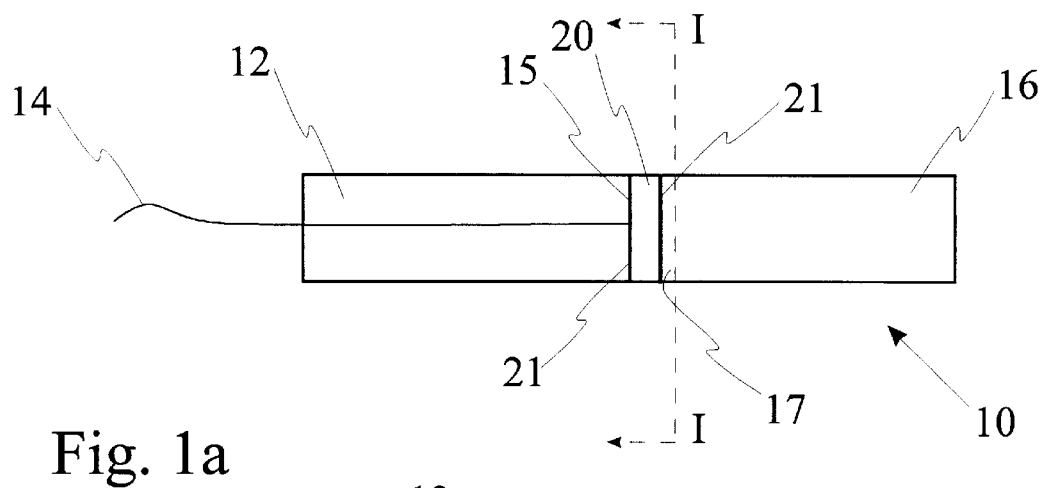
FIG. 1A is a side view of a coupler assembly according to the invention.

FIG. 1A shows a preferred embodiment of the present invention generally at 10. A ferrule 12 supporting fiber end 14 has a planar coupling face 15. A lens 16, such as a GRIN lens commonly used in this configuration, also has a planar coupling face 17. Instead of joining the two coupling faces with epoxy as practiced in the art, stand off element 20 is provided as a coupling member between the two coupling faces. In this embodiment, stand off element 20 has opposite planar surfaces 21 which are substantially parallel to meet with the coupling faces 15, 17 and to maintain the alignment of the coupling. The thickness of stand off element 20 may be selected to provide the desired separation between the fiber 14 and the lens 16. For applications where the separation distance is not critical, a thickness is selected which provides handling ease without significant increase to the size of the coupling system. To minimise reflection caused by the small air gap within the aperture of the stand off element, an anti-reflective coating may be applied to the faces of the elements.

Figure 1B:
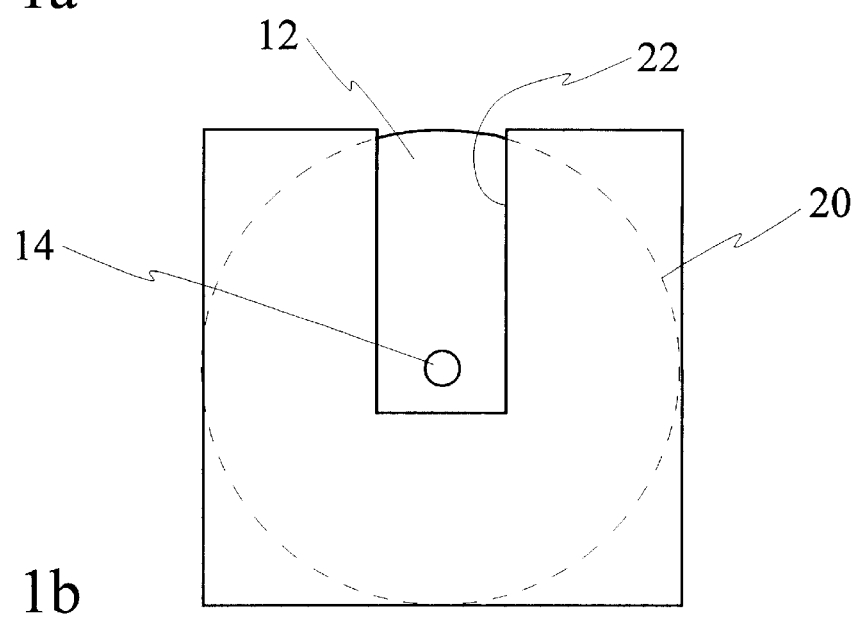
FIG. 1B is a cross-sectional view of the embodiment of FIG. 1A along line I—I.

Stand off element 20 has a central open area 22, as shown in FIG. 1B comprising a central slot. The open area 22 can be of any shape to provide sufficient passage for the beam transmission, as well as sufficient surface contact for secure adhesive coupling. The slot shape offers greater flexibility in one direction for tuning adjustment for aligning the beam or beams with the desired port to the lens 16. Adhesive to assemble the coupling is applied to the stand off element 20, and not in the central open area 22. As a result, coupling is accomplished without obstructing or hindering the quality of the optical transmission with epoxy between the optical elements.

The surface securing means is not limited to adhesive. Adhesive for securing the reference surfaces 21 of the stand off element 20 may be understood to include: epoxy, metal solder, glass solder, liquid glass, glue, etc. The stand off element is preferably constructed of glass, ceramic or some metals chosen for low thermal expansion characteristics. An appropriate surface securing means is selected depending on the material used. Optical elements may, for instance, be provided with a metal coating for soldering to a metal stand off element. Dimensional stability of the stand off element is also important to the accuracy and integrity of the coupling system.

Figure 2A:
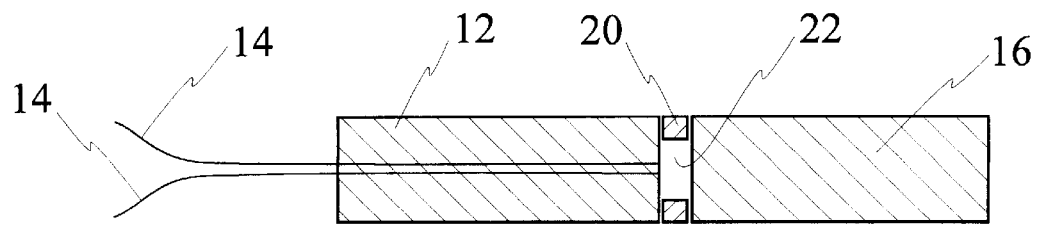
FIG. 2A is a cross-sectional view of a further embodiment according to the invention.
Figure 2B:
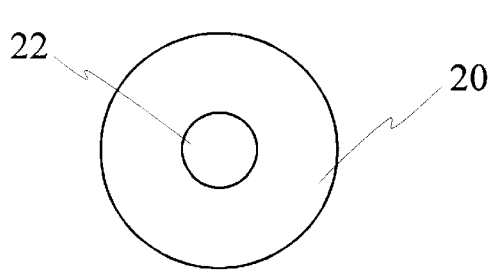
FIG. 2B and FIG. 2C are alternative stand off elements as illustrated in FIG. 2A
Figure 2C:
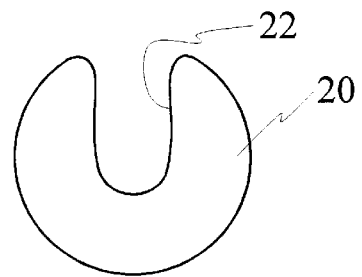

FIG. 2A shows a cross-section of an annular stand off member 20, similar to the embodiment of FIG. 1. In the cross-section the unobstructed transmission window 22 is clearly visible. One or more fibers 14 launch light into the lens 16. The actual beam width, even of a number of adjacent fibers, is very small. The coupling faces 15, 17 of the ferrule and the lens provide sufficient surface area for good adhesive contact without obstructing the transmission area. Like the embodiment of FIG. 1, the stand off element 20 has opposite parallel surfaces 22 which maintain the perpendicular orientation of the coupling faces 15, 17 of the ferrule 12 and lens 16. FIGS. 2B and 2C show alternative shapes of the stand off element 20. Of course, numerous other alternatives would suffice.

Figure 3:
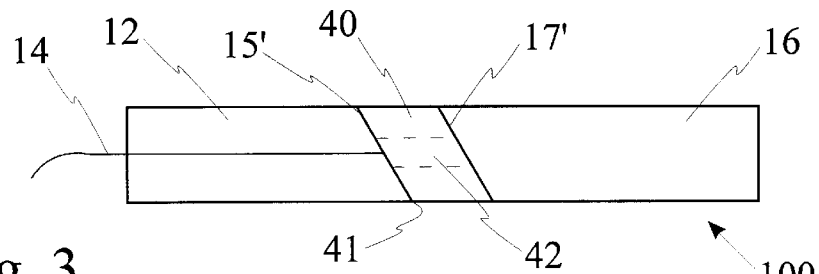
FIG. 3 is a side view of a further embodiment according to the invention.

FIG. 3 is a side view of a coupling assembly 100 which does not employ perpendicular surfaces to the longitudinal axis. The coupling faces 15', 17' form a complimentary angles matched by the parallel faces 41 of the stand off member 40 to avoid direct back reflection. The central aperture or window 42 can be virtually any shape.

Figure 4:
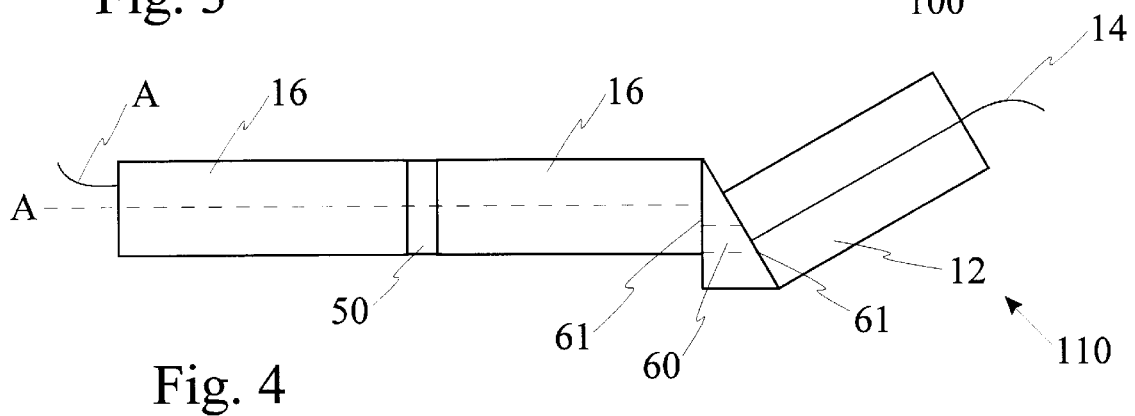
FIG. 4 is a side view of a further embodiment of a coupler and lens assembly according to the invention having reference surfaces provided at an angle to each other.

FIG. 4 illustrates a lens assembly including two GRIN lenses 16 and a filter 50 between them. An input fiber 4 is coupled to the first lens 16 adjacent the optical axis A. Due to the separation between the lenses 16 equal to the thickness of the filter 50, the output beam will exit at an angle to the optical axis A. To efficiently couple fiber 14, stand off member 60 provides reference faces 61 at an angle to each other to form the desired coupling angle.

Figure 5:
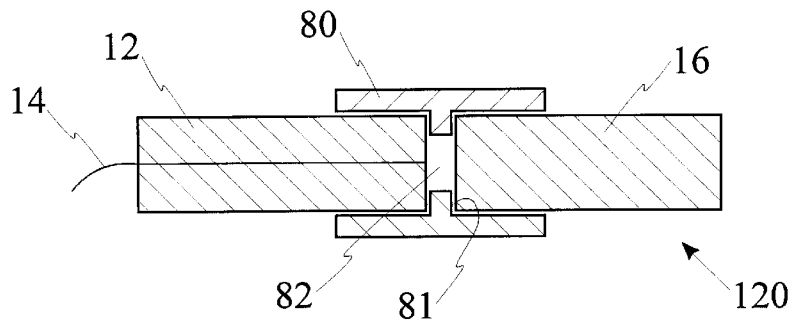
FIG. 5 is a cross-sectional view of a further embodiment of a coupler assembly according to the present invention having an outer sleeve.

FIG. 5 is a cross-sectional view of a sleeve connector 120 which incorporates internally an annular stand off element 80 according to the present invention. The sleeve 80 offers lateral strength to the coupling assembly.

FIG. 6 is a side view of a further embodiment of the invention shown generally at 140. Stand off element 90 is provided with projecting reference flanges 92, 93 at different positions on each coupling face 91 to facilitate aligning a fiber 14 to a port adjacent the optical axis A of the lens 16.

FIG. 7 illustrates an assembly 160 in which multiple stand off elements 20 are used to provide reliable and unobstructed coupling through the entire assembly. A pair of lenses 16 surround a filter 50, each lens 16 coupled by a stand off element 20. A pair of fibers 14 launch and transmit light through the assembly. An additional fiber 15 transmits a reflected signal. Each fiber end 14 is supported in a ferrule 12. The distal end face of the each of the ferrules 12 is secured to a coupling face of one of the lenses 16 by a stand off element 20. Thus through the complete assembly 160, clear transmission is possible unobstructed by epoxy at each joint.

FIG. 8 illustrates a prior art coupling incorporating a sleeve 30 in which a fiber 14 within a ferrule 12 and a lens 16 are joined. Epoxy 32 between the sides of the ferrule 12 and the lens 16 secures the optical elements to the inner wall of the sleeve 30.

FIG. 9 illustrates a further prior art coupling in which a coupling face of a ferrule 12 supporting a fiber end 14 is joined directly to a coupling face of a lens 16 with an epoxy layer 32.

In assembly the stand off member 20 of selected dimension and angular configuration is provided with adhesive on a first face and is then centred on the transmission area of the ferrule. Additional epoxy is applied to the opposite face of the stand off member and the appropriate region of the lens is located in alignment with the transmissive window. A coupling element provided with pressure activated adhesive on its coupling faces permits rapid assembly.

The preceding examples are for illustration only, and are not intended to be limiting. Numerous other embodiments will be apparent to persons of skill in the art, without departing from the spirit and scope of the invention as defined in the appended claims.

What is claimed is:

1. A coupling element for joining a first optical element to a second optical element comprising:

a stand off element having a light transmissive region for passing light unobstructed between said first optical element and said second optical element, the light transmissive region being larger than one or more beams of light for transmission therethrough, to provide tolerance for tuning adjustment between the first optical element and the second optical element, a first face for securing to a coupling end face of said first optical element; and a second face for securing to a coupling end face of said second element, wherein the first and second face each includes a substantially planar surface for permitting tuning alignment adjustment between the first optical element and the second optical element in a plane intersecting an optical axis through the first or the second optical element.

2. A coupling element as defined in claim 1, wherein at least one of the first or second faces of the stand off element is a planar surface at a non-perpendicular angle to the optical axis of the first or the second optical element.

3. A coupling element as defined in claim 2, wherein at least one of the first and second faces of the stand off element is at an angle equal to the coupling end face of the first optical element or the second optical element.

4. A coupling element as defined in claim 2, wherein at least one of the first and second faces of the stand off element is at an angle complimentary to the coupling end face of the first optical element or the second optical element.

5. A coupling element as defined in claim 1, wherein the first optical element comprises a housing supporting a fiber end.

6. A coupling element as defined in claim 5, wherein the second optical element comprises a collimating lens.

7. A coupling element as defined in claim 1, wherein the stand off element comprises an annular element with a central aperture.

8. A coupling element as defined in claim 1, wherein the stand off element comprises a U-shaped element having an open channel for passing light unobstructed.

9. A coupling element as defined in claim 1, further including an adhesive layer on the first face and on the second face of the stand off element.

10. A coupling element as defined in claim 1, wherein the first and second faces of the stand off element are substantially parallel planar surfaces having a determined thickness between them.

11. A fiber coupling comprising:

a housing supporting a fiber end, said housing having a coupling face;

a second optical element for optical coupling with the fiber end having a coupling face;

a coupling member for joining the housing and the second optical element having opposite sides, each defining a reference plane for permitting tuning alignment adjustment between the fiber end and the second optical element in a plane intersecting an optical axis through the first or the second optical element, secured between the coupling faces, and having at least an aperture therein for transmitting light therethrough, wherein the aperture within the coupling member is larger than one or more beams of light for transmission therethrough, to provide tolerance for tuning adjustment between the fiber end and the second optical element.

12. A fiber coupling as defined in claim 11, wherein one of the opposite sides of the coupling member defines a reference plane at an angle to the reference plane defined by the other opposite side of the coupling member.

13. A fiber coupling as defined in claim 12, wherein at least one of the opposite sides of the coupling member defines a reference plane at an angle equal to the coupling face of the housing or the second optical element.

14. A fiber coupling as defined in claim 12, wherein at least one of the opposite sides of the coupling member defines a reference plane at an angle complimentary to the coupling faces of the housing or the second optical element.

15. A fiber coupling as defined in claim 11, further including an outwardly projecting surface at a determined distance from the aperture on one of the opposite sides for receiving the housing, and an outwardly projecting surface at a second different determined distance from the aperture on the other of the opposite sides for receiving the second optical element for establishing a coupling to a port on the second optical element.

16. A fiber coupling as defined in claim 11, wherein the opposite sides of the coupling member define substantially parallel reference planes having a determined distance between them.

17. A fiber coupling as defined in claim 11, further including an adhesive layer on the opposite surfaces of the coupling member.

18. A fiber coupling as defined in claim 11, wherein the second optical element comprises a lens.

19. A method of coupling an optical fiber end to a lens comprising:
- encasing an end of the optical fiber in a supporting ferrule having a distal coupling face;
- providing a lens for coupling to the fiber end having a coupling face;
- providing a coupling member having opposite surfaces adapted for mating contact between the coupling face of the ferrule and the coupling face of the lens, and having an open area for transmitting light therethrough;
- securing one of the opposite surfaces of the coupling member on the coupling face of the ferrule, aligning the open area with the fiber end within the ferrule to permit unobstructed transmission therethrough;
- securing the other of the opposite surfaces of the coupling member to the coupling face of the lens, aligning the desired portion of the lens with the fiber end and the open area of the coupling member by providing tuning adjustment in a plane intersecting an optical axis of the lens, defined by one of the opposite surfaces of the coupling member.

\* \* \* \* \*